United States Patent [19]
Pearson

[11] Patent Number: 5,703,784
[45] Date of Patent: Dec. 30, 1997

[54] MACHINE VISION APPARATUS AND METHOD FOR SORTING OBJECTS

[75] Inventor: Thomas C. Pearson, Davis, Calif.

[73] Assignee: The United States of America as represented by the Secretary of Agriculture, Washington, D.C.

[21] Appl. No.: 550,310

[22] Filed: Oct. 30, 1995

[51] Int. Cl.$^6$ ............................ G06F 19/00; B07C 5/342
[52] U.S. Cl. .................. 364/478.11; 209/581; 209/586; 348/91; 382/110; 382/141; 364/555
[58] Field of Search ...................... 364/487.11, 487.12, 364/555, 525, 526; 382/110, 141; 209/552, 576, 580, 581, 582, 586; 348/89, 91

[56] References Cited

U.S. PATENT DOCUMENTS

| | | | |
|---|---|---|---|
| 4,454,029 | 6/1984 | Codding | 209/581 |
| 4,514,816 | 4/1985 | Ollus et al. | 364/555 X |
| 4,718,558 | 1/1988 | Castaneda | 364/571.04 X |
| 4,951,825 | 8/1990 | Hawkins et al. | 364/555 X |
| 4,975,863 | 12/1990 | Sistler | 364/555 |
| 5,230,026 | 7/1993 | Ohta et al. | 364/555 X |
| 5,321,764 | 6/1994 | Cullen et al. | 364/555 X |

OTHER PUBLICATIONS

S. Tang, M. J. Delwiche, and J. F. Thompson, "A Distributed Multiprocessor Imaging System for Prune Defect Sorting," Paper No. 89–3026, written for presentation at the Jun. 25–28, 1989 International Summer Meeting of the American Society of Agriculture Engineers (ASAE) and the Canadian Society of Agricultural Engineering, Quebec, Canada.
T. C. Pearson, D. C. Slaughter, and H. E. Studer, "Physical Properties of Pistachio Nuts," *Transactions of the ASAE* 37:913–918 (1994).

*Primary Examiner*—Joseph Ruggiero
*Attorney, Agent, or Firm*—Margaret A. Connor; M. Howard Silverstein; John D. Fado

[57] ABSTRACT

An object is sorted into different classes by producing a video image of the object. The signal level discontinuities in the image are evaluated by first deriving a video signal gradient of each pixel in the image. Then the number of pixels in three different signal gradient ranges are counted to produce count parameters which combined indicate the areas of differing contrast in the object. The count parameters are utilized in a pair of discriminate functions which define the two classes and solution of the discriminate functions are used to determine the probability that the object fits within one class. In response to the probability the object is directed along either a first path associated with one class or along a second path associated with the other class.

14 Claims, 7 Drawing Sheets

MACHINE VISION APPARATUS AND METHOD FOR SORTING OBJECTS

BACKGROUND OF THE INVENTION

The present invention relates to apparatus for automatically grading and sorting objects, such as pistachio nuts; and more particularly to such apparatus which incorporate a machine vision system.

Most shell stains on pistachio nuts are caused by a defect on the hull known as an "early split." An early split is an abnormal lesion on the suture of the hull which occurs three to six weeks before harvest. Normally, the shell of a pistachio nut opens two or three weeks before harvest and the hull stays intact serving as primary protection for the kernel. However, on about two to four percent of the nuts, the shell splits open early and causes the hull to split, leaving the kernel vulnerable to airborne mold spores and insect infestation. Early split nuts are more likely to be infested by insects and the aflatoxin producing mold, *Aspergillus flavus*, than normal nuts. Also, the shells of early split nuts are more likely to be stained.

The pistachio industry currently utilizes a variety of methods and equipment to sort stained or blemished nuts from the high grade product. Bi-chromatic "color" sorters are used to remove badly stained nuts. Rejected nuts are usually shelled and the kernels sold for use in prepared foods. Nuts accepted by the automated color sorters still have to be manually re-inspected for final grading. Nuts with large amounts of staining, hull adherence, or odd shapes are removed for shelling. Nuts that have moderate amounts of staining are dyed red, or sold as lower grade product. Nuts apparently infested with insects are discarded. Large, clean, unstained nuts are sold at a premium price.

The bi-chromatic color sorters utilize an optical sensor that responds to light in two wavelength bands, hence the name bi-chromatic. The wavelength bands encompass the typical stain colors and the output signal from the bi-chromatic sensor indicates the average color of the nut. If a nut has a dark stain, the sorter likely will reject it. However, many acceptable nuts have minor stains near their stem, or have wide shell openings, exposing a large amount of the dark kernel. These nuts likely will be rejected by the bi-chromatic sorter as the average color is within the range of excessive stains. On the other hand, many stained nuts are judged acceptable by the bi-chromatic color sorters because the stains do not cover enough shell area to significantly change the average color. This results in extra labor required to hand sort the nuts.

Stained nuts comprise approximately five percent of the entire pistachio crop (excluding nuts with minor, acceptable stains near the stem). The shelling and dye stock grades comprise approximately 15% of the entire crop, depending on the processor. Most stained nuts are classified as shelling or dye stock after inspection by the bi-chromatic color sorter or manual sorters.

Therefore, there remains a need for a machine that has the resolution and computational power to separate nuts with small stains from unstained nuts with large kernel exposures. This will reduce the amount of manual labor involved in the final grading, and reduce the amount of high quality nuts from being sold as a lower quality product.

SUMMARY OF THE INVENTION

A general objective of the present invention is to provide a system and method for classifying an object, such as a pistachio nut, based on surface characteristics.

Another objective is to base the classification on the number and relative size of areas of different coloration on the object surface.

These and other objectives are fulfilled by a system which produces a video image of the object which comprises a series of pixels each having an intensity. Preferably several video images of the object, such as a pistachio nut, from different angles are acquired and processed to evaluate the object's surface, e.g. for stains. Initially a signal level gradient is determined for a plurality of pixels in the video image. The gradient corresponds to how much the video signal level changes at a given pixel.

The pixels in the video image which have a gradient within a predetermined range of gradient values are counted to produce a parameter count. A probability that the object fits within a specific class is determined from the parameter count. In the preferred embodiment, the gradient and intensity of each pixel are evaluated to determine whether the pixel fits within one of three ranges of surface characteristics. The quantities of pixels falling within each range are utilized to derive solutions of a discriminate function related to each class for the object. The probability of the object being within each class is determined based on the solutions to the discriminate functions.

The relationship of the probability for a given class to a predefined threshold value determines along which one of several paths to direct the object with each path associated with one of the object classes. For example, the paths can correspond to different grades of pistachio nuts.

The present invention processes an image of an object to determine discontinuities in the image intensity at which the intensity level makes a quick change of a given magnitude. Intensity discontinuities provide an indication of the degree of abnormality of the object's surface. For example, the intensity discontinuities in an image of the surface of a nut indicates the number and severity of stains and thus the nut's market quality.

DETAILED DESCRIPTION OF THE INVENTION

Figure 1:
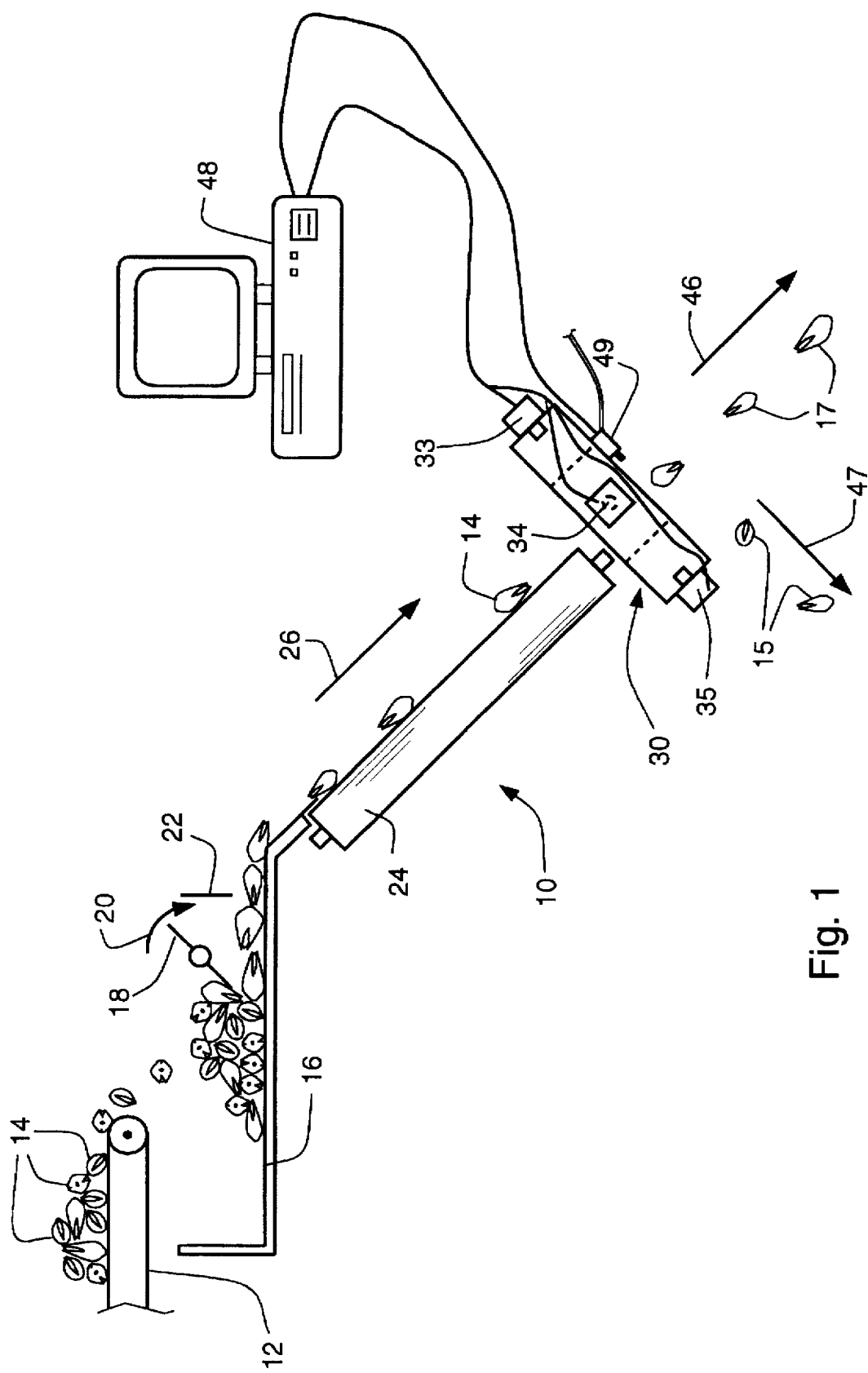
FIG. 1 is a diagrammatical representation of an apparatus for sorting pistachio nuts.

With initial reference to FIG. 1, the present invention will be described in terms of apparatus for sorting pistachio nuts, however, the inventive concept can be applied to sorting other types of agricultural products, such as peanuts or string beans, and even non-agricultural commodities based on surface characteristics. The sorting apparatus 10 has a conveyor belt 12 which carries pistachio nuts 14 from a bulk supply bin to the sorting apparatus. The nuts 14 drop off conveyor belt 12 onto a vibrating hopper 16 equipped with a rotating paddle 18 which turns in the direction indicated by arrow 20. The rotating paddle 18 breaks up any jambs which might otherwise occur in the vibrating hopper. A gate 22 is spaced slightly above the surface of the hopper at the output end so that only one nut at a time can pass therebetween. Sidewalls (not shown) are angled in a "V" with the small opening at the apex adjacent the gate 22 to linearize the flow of nuts in the horizontal dimension so that only one nut at a time is ejected from the vibrating hopper. Thus, the vibrating hopper assembly 16 singulates and orients the nuts 14 as they travel away from the conveyor 12. The nuts 14 are oriented so that their long axis is parallel with the direction of this travel.

The nuts flowing from the vibrating hopper fall down onto a pair of downward sloping rollers 24 which are closely spaced side-by-side to prevent a nut from falling therebetween. The rollers 24 form a groove in which the nuts slide as indicated by arrow 26. A 43° angle of inclination of the rollers maintains a 40 nut per second throughput rate and creates a gap between the nuts in order for one to be individually inspected and sorted.

Figure 2:
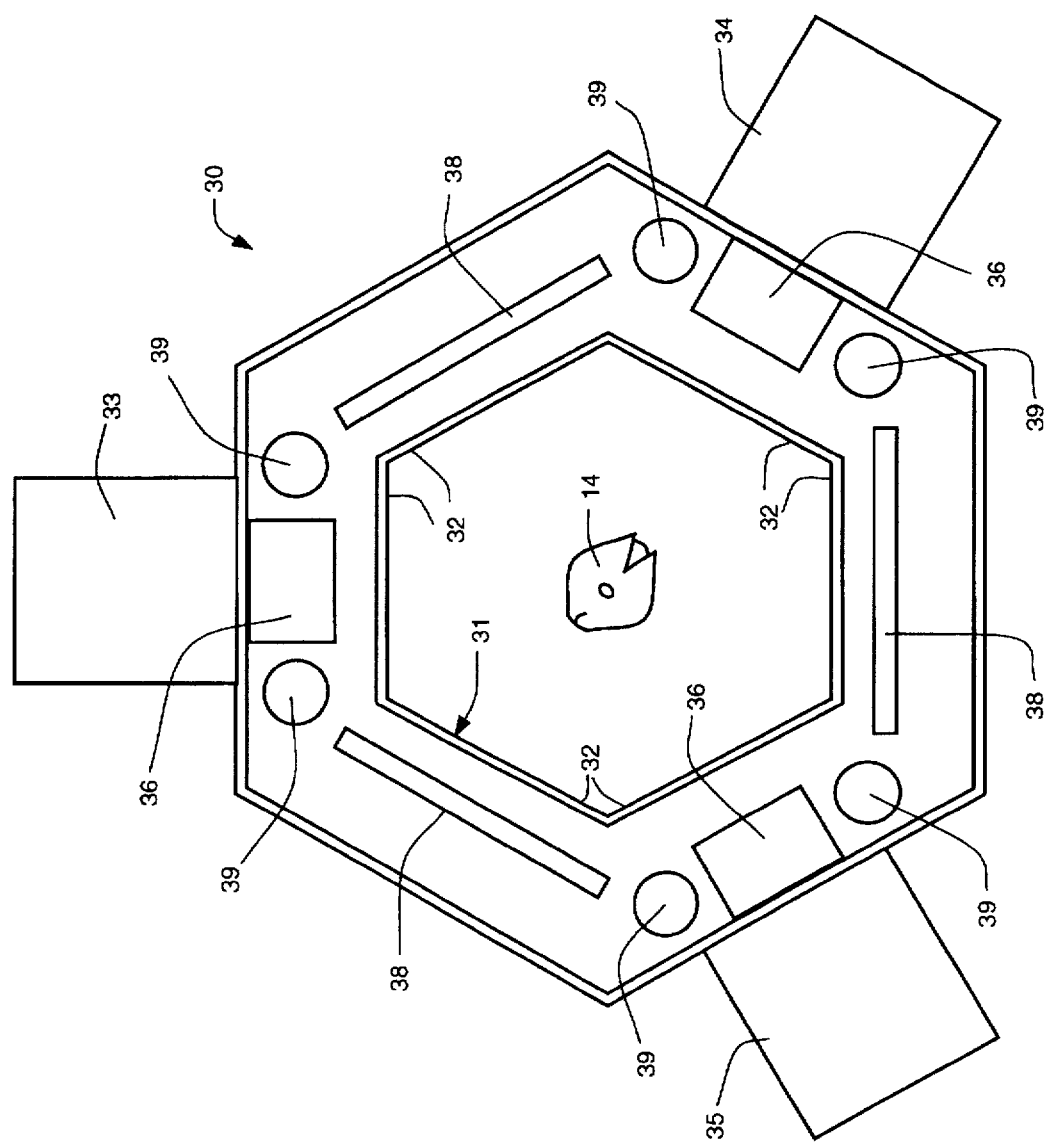
FIG. 2 is a camera assembly in the apparatus of FIG. 1.

A video camera assembly 30 is positioned adjacent the opposite end of the rollers 24 from the vibrating hopper 16. The nuts, falling off of the remote end of the rollers 24, travel through a tube 31 formed by six glass panels 32 arranged in a hexagonal cross-section, as shown in FIG. 2. Three monochrome, line scan video cameras 33, 34, and 35 are positioned at 120° increments around the hexagonal tube 31. Each camera produces a line image having 256 picture elements, or pixels, and two dimensional image data is acquired by scanning several lines as a pistachio nut moves through the camera assembly 30. An optical filter 36 with a band pass range of 630 nm to 690 nm is placed in front of the lens of each line scan video camera 33-35. The band pass filters sensitize the cameras to light wavelengths reflected from the nuts so as to detect darker stains on the relatively light shell of a pistachio nut. A series of lights 39 are positioned around the glass tube 31 to illuminate the pistachio nuts 14 traveling through the camera assembly 30. A separate background plate 38 is placed adjacent the tube 31 directly opposite the position of each line scan video camera 33-35. The background plates 38 are painted the same color as an ideal unstained pistachio nut shell. Thus, the image produced by each video camera 33-35 will have dark pixels corresponding to stains on the pistachio nut shells and the remaining sections of the image should have a relatively brighter intensity level.

Figure 3:
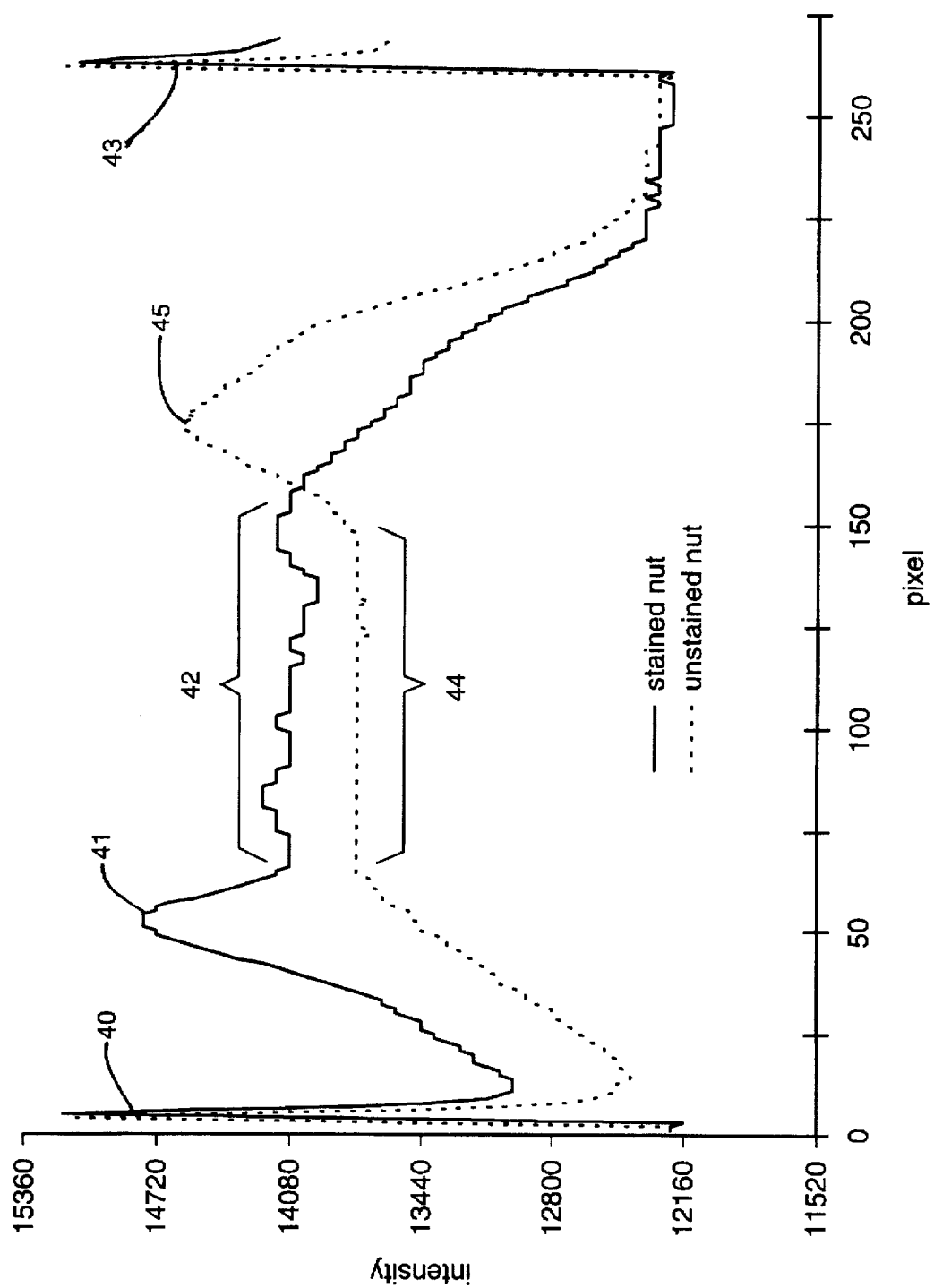
FIG. 3 is a graph of pixel data from a camera in FIG. 2 for both stained and unstained pistachio nuts.

FIG. 3 depicts the signal for one line scan produced by one of the video cameras 33-35 in which darker image areas have higher signal intensity. The solid line of the graph represents pixels from a stained nut, while the dashed line represents pixels from an unstained nut. Referring to the line for an stained unstained nut, the camera signal begins with a relatively high intensity start pulse 40 and then drops in intensity. A relatively wide high intensity pulse 41 occurs at a point where the kernel shows through a split in the shell. Thereafter peaks and valleys occur in signal region 42 and correspond to changes in the darkness of the shell between stained and unstained sections. Finally, the intensity level decreases to the level of the background plate 38 until the next start pulse 43.

The signal waveform for the unstained nut is contrasted with that of the stained nut as the surface region 44 in the line scan is relatively uniform in intensity, lacking the peaks and valleys produced by stained and unstained regions. In this particular example, the scan of the unstained nut terminates with a relatively intense, wide peak 45 which corresponds to the kernel showing through the cracked shell. Thus, as shown graphically in FIG. 3, the line scan waveform for a stained nut has greater signal variation produced by the stained and unstained regions of the nut surface, as compared with the signal waveform for a preferred unstained nut.

Referring again to FIG. 1, the signals from the line scan video cameras 33-35 are supplied to a video processing board within personal computer 48. As will be described in detail, the personal computer 48 evaluates the waveforms from each line scan camera 31-35 to determine the degree of discontinuity in the video signal levels. Such discontinuity corresponds to changes in color in the image and thus the amount of staining on the pistachio nut shell surface. Although a number of techniques, such as polynomial curve fitting, may be employed to measure the degree of signal discontinuity, the present method calculates the signal level gradient for each pixel. The pixel gradient magnitudes and signal intensities then are evaluated to detect and quantify the discontinuity. When the degree of discontinuity is sufficient to reject the nut, an output circuit of the computer 48 activates a solenoid valve 49 which creates a jet of air across the outlet opening of the tube 31 in camera assembly 30. This air jet blows the previously examined nut along a trajectory indicated by arrow 47 thereby rejecting nuts 15, which are unacceptably stained, into a receptacle. When an acceptable nut is detected, the solenoid valve 49 is not activated so that the acceptable nuts 17 are allowed to continue along a trajectory 46 into another receptacle.

In addition to using sorter 10 to reject extremely stained nuts which may be totally unacceptable to consumers, the sorter may be positioned downstream of a bi-chromatic sorter to further process sorted lower grade nuts 17 into two categories, nuts with slight blemishes requiring red shell dying and nuts to be shelled for processed foods, or salvaged high quality nuts that were rejected because they had wide shell splits.

Figure 4:
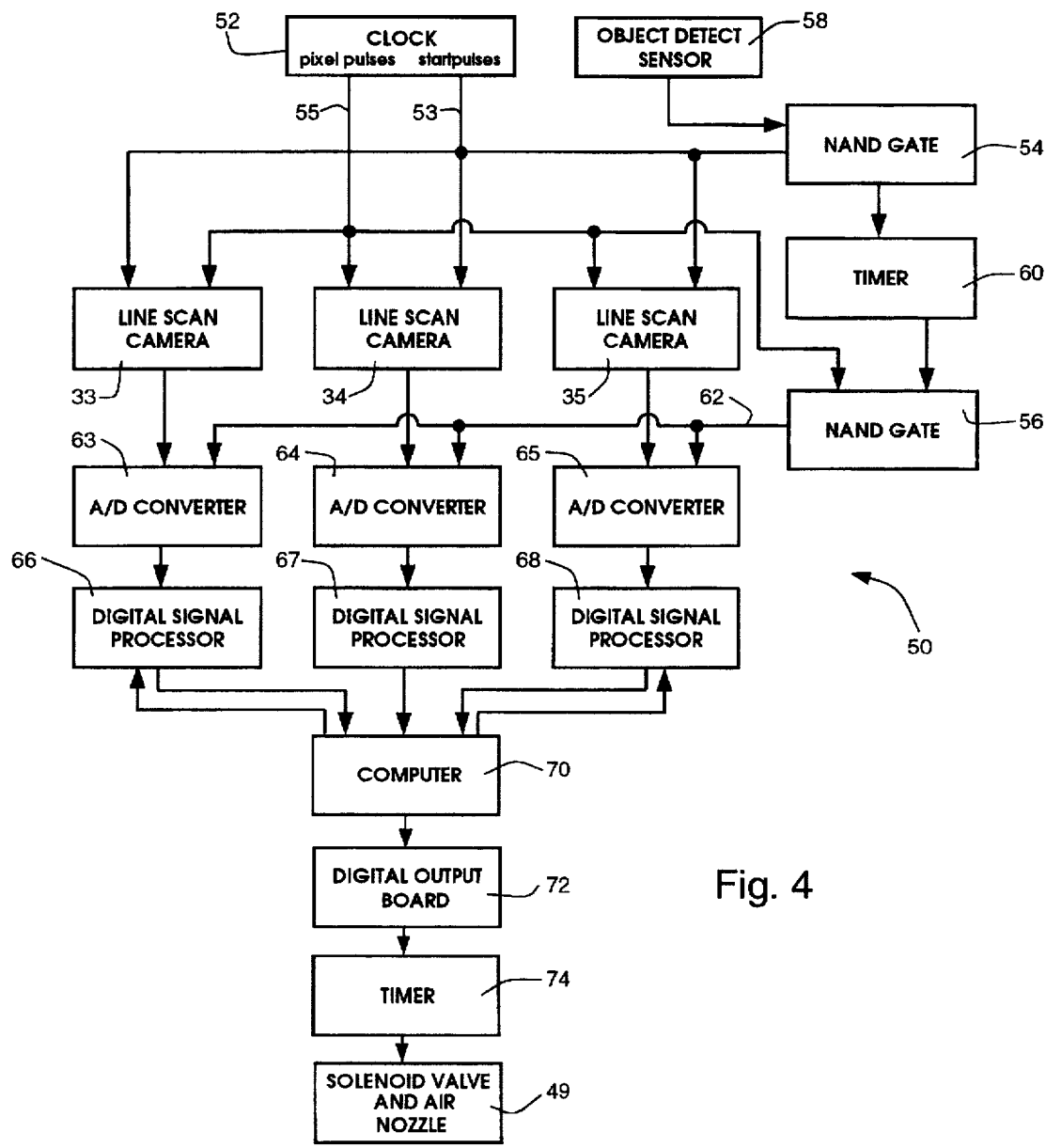
FIG. 4 is a block schematic diagram of the image processing system employed in the nut sorting apparatus.

Referring to FIG. 4, the signal processing circuitry 50 of the sorter 10 comprises a clock generator 52 which produces timing signals for synchronizing the operation of the circuit components. The clock produces a start pulse signal on line 53 which is applied to each of the line scan cameras 33-35, and to an input of a first NAND gate 54. The clock generator 52 also produces a second signal on line 55 having pulses at the pixel rate and the second signal is applied to the line scan cameras 33-35 and to an input of a second NAND gate 56. The first NAND gate 54 also receives the output signal from a photo-optical object sensor 58 which generates an output pulse each time a nut is within the tube 31 of the camera assembly 30. The output signal from the first NAND gate 54 activates an image acquisition timer 60 when a line scan start pulse occurs during the presence of an object within the camera assembly 30. The acquisition timer signal is applied to another input of the second NAND gate 56 and to a computer 70. An active acquisition timer signal causes the second NAND gate 56 to produce signal pulses on output line 62 at the pixel clock rate. The signal on line 62 acts as a trigger for separate analog-to-digital converters 63, 64, and 65 associated with one of the line scan cameras 31, 34, and 35, respectively. The acquisition timer 60 controls the time duration that the video waveform is applied to the A/D converters and the second NAND gate 56 activates the analog to digital converters 63–65 at each pixel pulse while the timer is activated. For example, the line scan video cameras produce 256 pixels per line and are driven at a 200 kHz pixel rate. The timer 60 activates the A/D converters for 11.5 milliseconds, which is sufficient to fully capture seven lines of pixel data for each pistachio nut 14 falling through the camera assembly 30. However, most nuts travel out of the camera view before six lines have been acquired. Only larger nuts, over 20 mm long have data in all seven lines. The nuts travel about 3 mm between each line scan, and thus the combined line scan image from each camera represents approximately four percent of the entire surface area of the nut. As is apparent, the clock generator signals control the acquisition of line scan image data from the cameras 33–35 and the output signal from the three cameras is digitized by the A/D converters 63–65 when a pistachio nut is present in the camera assembly 30.

The fourteen bit digitized video signal at the output of each A/D converter 63–65 is applied to a separate digital signal processor 66, 67, or 68 so that data from each of the cameras is evaluated simultaneously by three independent, parallel signal processing branches. For example, each digital signal processor 66–68 is a model TMS 320C31 manufactured by Texas Instruments. This particular digital signal processor with a data input rate of 200 kHz enables the evaluation described hereinafter to be performed between each pixel input. Therefore, most of the computations can be completed before a nut 14 travels out of camera view thus enabling high product throughput.

The images produced by each line scan camera 33–35 are evaluated by the separate digital signal processor 66–68 and the results are applied to parallel input ports of the computer 70 within the personal computer 48. The computer evaluates the results from each digital signal processor and reaches a determination as to the acceptability of the pistachio nut currently being processed. If a determination is made that the nut is unacceptable, the computer sends a signal to a digital output board 72 which activates a rejection valve timer 74. While the valve timer 74 is active, an output signal is applied to the solenoid valve 49 (FIG. 1) to produce a jet of air which directs the rejected pistachio nut along path 47. The solenoid valve 49 remains open for the period determined by the valve timer 74.

Figure 5A:
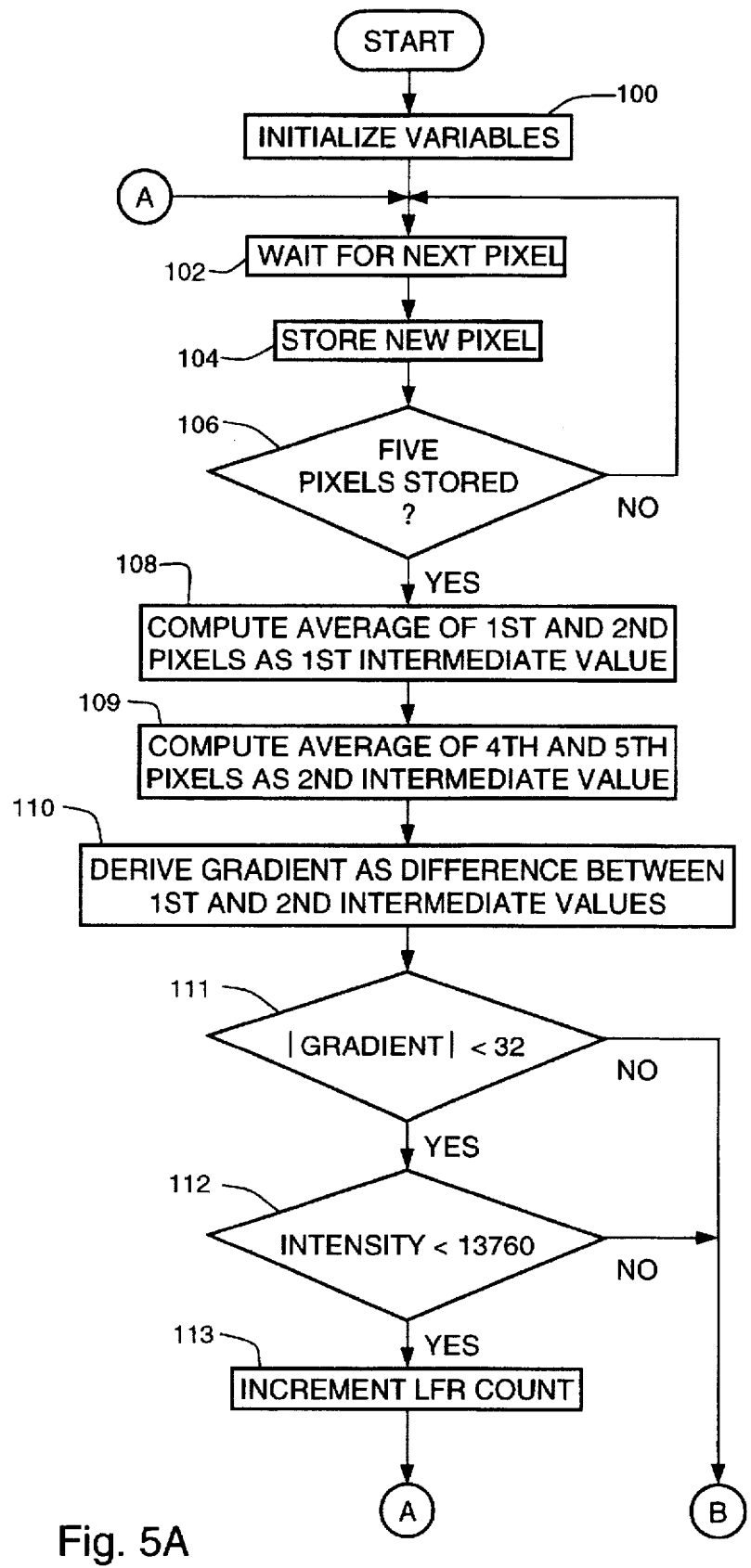
FIGS. 5A and 5B form a flowchart of software executed by the digital signal processors in FIG. 4.

The digital signal processors 66–68 are programmed to evaluate the seven video line scans for a given nut and quantify the degree of staining. The evaluation program is depicted by the flowchart which begins on FIG. 5A. At the commencement of image acquisition for a new nut the variables are initialized at step 100 before the digital signal processor waits for a pixel at step 102. Upon receipt, each pixel is stored at step 104 in a pipeline memory within the digital signal processor 66–68. The processing can commence after five pixels have been acquired which is determined at step 106.

Once the requisite number of pixels has been received, the signal gradient of the third pixel in memory is calculated. The signal gradient for a given pixel indicates the degree to which the video signal level changes at that pixel, To calculate the signal gradient, the digital values for the first and second pixels in the stored group of five pixels is computed to produce a first intermediate value at step 108. Then the average of the fourth and fifth pixels in the group is computed at step 109 to derive a second intermediate value. The difference between the two intermediate values is calculated to produce a signal gradient for the third pixel in the stored group at step 110.

The signal gradient and intensity of each pixel in the seven line video image are utilized to derive three parameters that quantify the stain characteristics of the imaged pistachio nut. The first parameter of the camera signal quantifies the size of low flat regions (LFR) in the signal. This is done by counting pixels with an absolute signal gradient value less than or equal to 32 and intensity less than the 13760. Specifically, at step 111 the computed signal gradient for the pixel is inspected to determine if it is less than 32 and, if so, the program execution branches to step 112 to check if the pixel intensity is less than 13760. If both of these tests are satisfied, the variable LFR is incremented at step 113 before the program execution returns to step 102 to await the acquisition of another pixel. The next pixel is stored in the pipeline memory of the digital signal processor and the oldest pixel is removed from the pipeline.

Figure 5B:
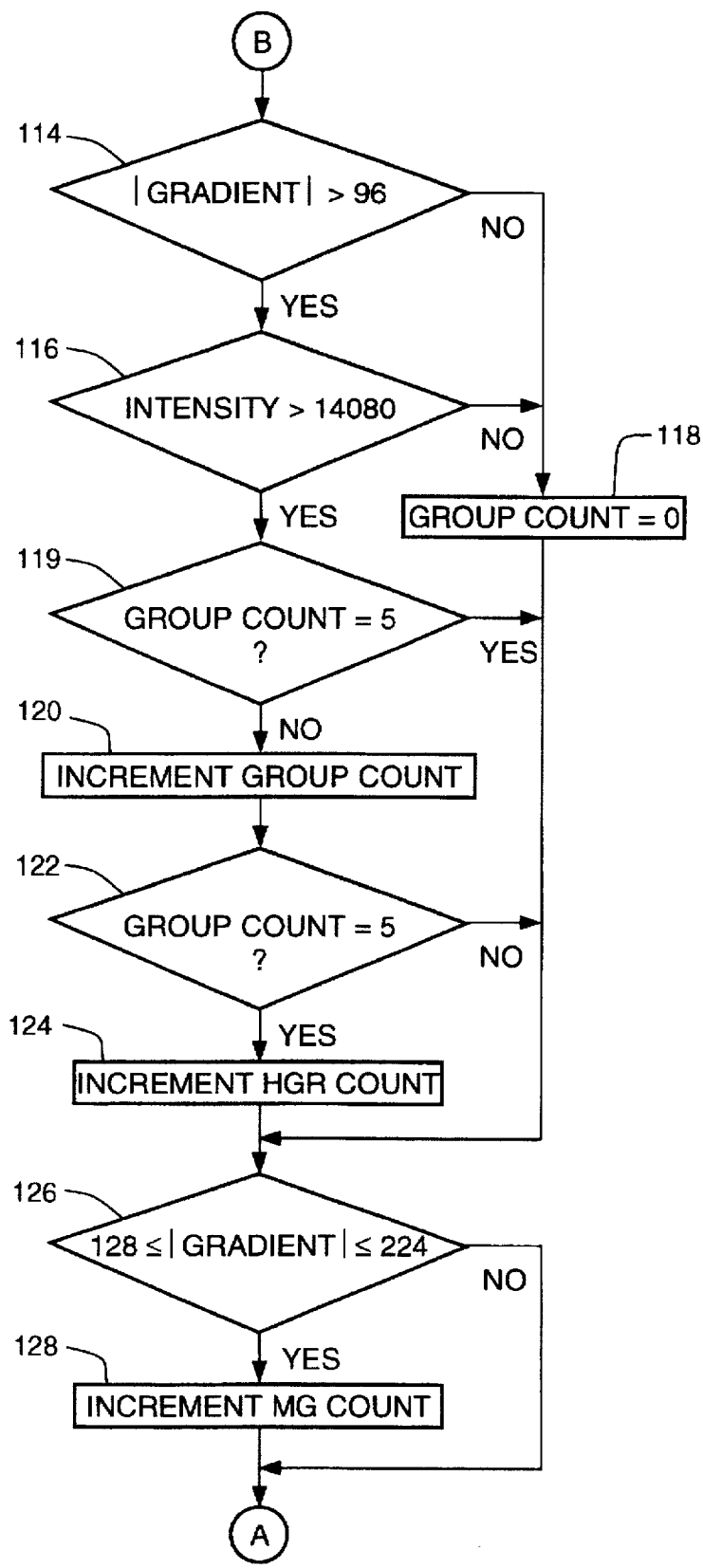

If both the signal gradient and intensity criteria for a low flat region are not found satisfied at steps 111 and 112, the program execution advances to step 114 on FIG. 5B for the next parameter related to major signal peaks, or high gradient regions (HGR). The HGR parameter is computed by counting the number of distinct regions of five or more contiguous pixels which have an absolute signal gradient value greater than 96 and an intensity that is greater than 14080. In order for a high gradient region of at least five qualifying pixels to be counted, that region must be separated from any adjacent high gradient region by at least one pixel that does not satisfy the HGR criteria.

Specifically, at step 114 the absolute value of the signal gradient is inspected by the digital signal processor to determine if it is greater than 96. If it is not, the program execution branches to step 118 where a counter value designated GROUP COUNT is reset to zero. If the signal gradient is greater than the threshold value of 96, the program execution advances to step 116 where the intensity value of the third stored pixels is inspected to see if it is greater than a 14080. If the third pixel is less than this intensity threshold, the program branches to step 118 where the value of GROUP COUNT is reset to zero.

When the third stored pixel satisfies the signal gradient and the intensity criteria for a high gradient region, the digital signal processor advances to step 119 where a check is made whether the GROUP COUNT reached five previously which indicates that the present high gradient region already has been counted. In that case, the GROUP COUNT will not be incremented until at least one pixel is found which does not satisfy the high gradient region criteria at which time the GROUP COUNT is reset to zero by the program branching from either step 114 or 116 to step 118. If at step 119 the GROUP COUNT is less than five, the program execution branches to step 124 where that count is incremented by one. Next, at step 122 another check is made whether the GROUP COUNT equals five in which case the value of the parameter HGR is incremented at step 124. Thus, the high gradient region parameter (HGR) is a count of the distinct regions of five pixels or more having a relatively high gradient and high intensity.

The program execution then advances to step 126 where the third parameter designated moderate gradient (MG) is calculated which quantifies the overall amount of stain discontinuity. The value of the moderate gradient (MG) is computed by counting pixels with an absolute signal gradient value greater than or equal to 128 and less than or equal to 224. Thus, at step 126 the signal gradient value for the present pixel is tested to see if it falls within this range. If it does, the program execution advances to step 128 where the variable MG is incremented before the program execution by the digital signal processor 66–68 returns to step 102 to await the acquisition of another pixel.

The pixel evaluation by the digital signal processors 66–68 continues to loop through steps 102–128 computing values for the three parameters LFR, HGR and MG, until timer 60 times-out at the end of the image acquisition period for a given pistachio nut. When this occurs, the second NAND gate 56 blocks the application of the pixel clock signal to the A/D converters 63–65, thereby terminating further pixel acquisition until the next nut is detected.

Figure 6:
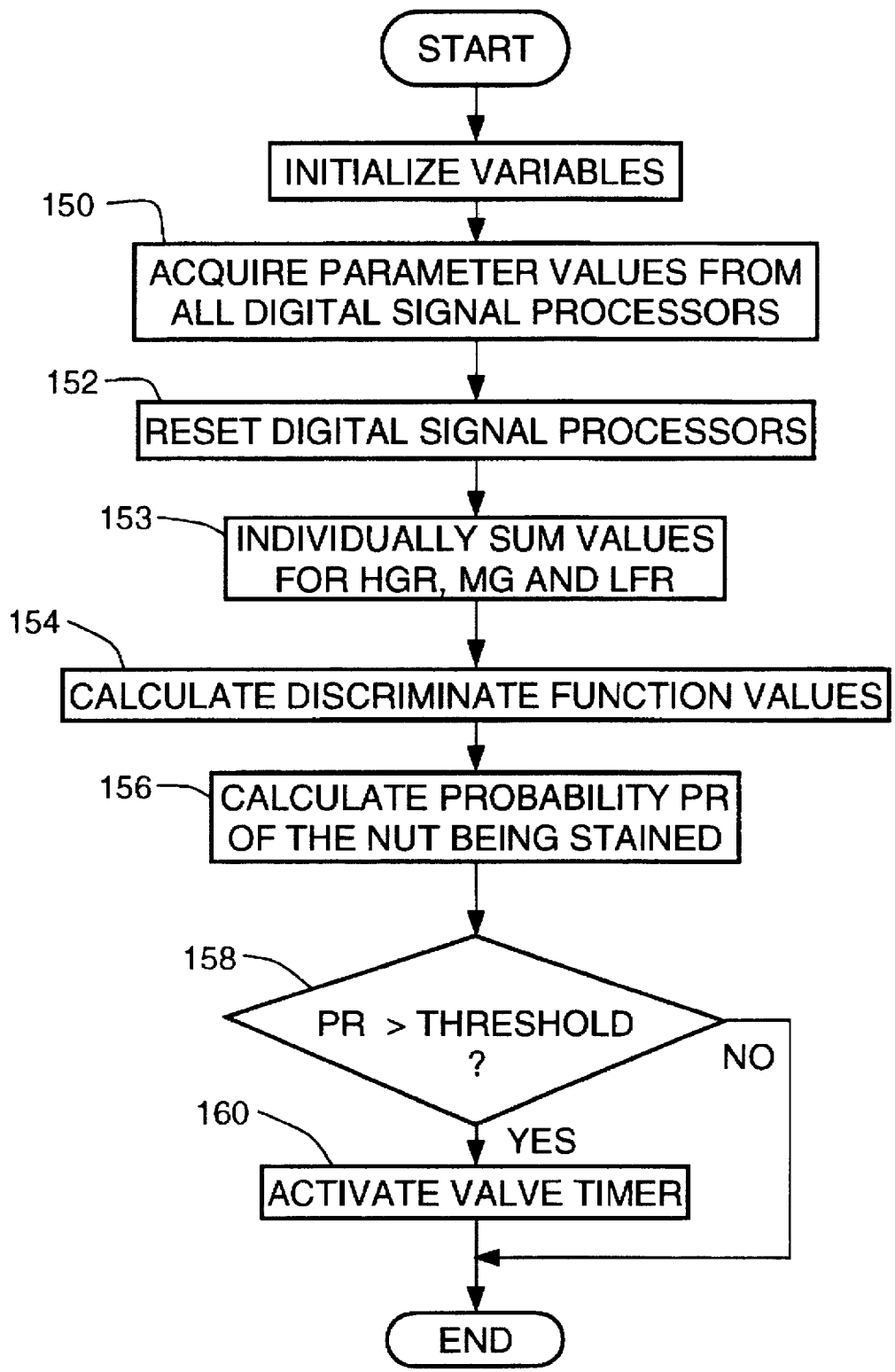
FIG. 6 is a flowchart of a routine executed by the microcomputer in FIG. 4.

One of the digital signal processors 66–68 which has been counting the pixels being processed, determines that seven lines of the image have been received and signals the computer 70 that data is available. Upon receiving that signal from the one digital signal processor, the computer circuitry 70 within the personal computer 48 begins executing the software routine depicted on FIG. 6 commences. At step 150 the computer 70 acquires the values of parameters LFR, HGR and MG from each digital signal processor 66–68 and stores those values in memory. Then at step 152 the three digital signal processors 66–68 are reset by a signal from the computer 70 in preparation to process pixels from another nut. It should be understood that while the use of all three parameters LFR, HGR and MG is preferred to fully quantify the degree of video signal discontinuity, an alternative system could utilize only one of those parameters or any combination of two parameters.

The program execution advances to step 153 where the LFR values from the three digital signal processors are summed into a value LFRS. Similarly the three HGR values and the three MG values are added to produce summations HGRS and MGS respectively. Next at step 154, the summation values are used to calculate discriminate functions D1 and D2 for stained and unstained nuts respectively. The discriminate functions are different depending upon whether the nuts being sorted previously have been processed by a bi-chromatic sorter or whether small shelling stock nuts are being sorted.

For sorting bi-chromatic processed nuts the discriminate functions D1 and D2 are:

D1=−5.26514+0.02602(MGS)+0.00936(LFRS)+0.27607 (HGRS)

D2=−5.84667+0.01991(MGS)+0.01446(LFRS)+0.05896 (HGRS)

Whereas to sort small shelling stock nuts the discriminate functions D1 and D2 are:

D1=−9.14496+0.04172(MGS)+0.02110(LFRS)+0.57367 (HGRS)

D2=−8.53480+0.03983(MGS)+0.02806(LFRS)+0.14685 (HGRS)

The precise discriminate functions may vary depending upon the specific type of object being sorted.

The selected discriminate functions D1 and D2 for stained and unstained nuts then are employed at step 156 to calculate a probability that the nut presently being processed is stained. That probability PR is determined according the expression:

$$PR = \frac{exp(D1)}{exp(D1) + exp(D2)}$$

The larger the probability PR the greater the likelihood that the present nut is stained. Therefore, at step 158 the probability value PR is compared to a threshold. A threshold value of 0.50 for bi-chromatic sorter rejected nuts properly classified 80% of the stained nuts and 92% of unstained nuts. For small shelling stock nuts, 80% of stained nuts and 90% of unstained nuts were correctly classified. A lower probability threshold than 0.50 would correctly classify a greater number of stained nuts at the expense of incorrectly classifying more unstained nuts.

The foregoing description is directed to the preferred embodiment of the invention. Although some attention was given to various alternatives within the scope of the invention, skilled artisans will likely realize additional alternatives that are now apparent from the disclosure of those embodiments. Accordingly, the scope of the invention should be determined from the following claims and not limited by the above disclosure.

I claim:

1. An object sorting method comprising steps of:

producing a video image of an object in which the video image comprises a series of pixels each having an intensity;

deriving signal gradients for a plurality of pixels in the video image;

defining a plurality of regions in the video image in which each region has a given plurality of pixels;

determining how many pixels have both a signal gradient that is less than a first signal gradient value and an intensity less than a first intensity value to produce a first parameter value;

determining how many regions exist wherein all the pixels in the region have both a signal gradient that is greater than a second signal gradient value and an intensity greater than a second intensity value to produce a second parameter value;

determining how many pixels have a signal gradient that is greater than a third signal gradient value and less than a fourth signal gradient value to produce a third parameter value; and selecting a path along which to direct the object in response to the first, second, and third parameter values; and directing the object along the selected path.

2. A method of sorting an object into one of at least a first class and a second class, said method comprising steps of:

producing a video image of an object in which the video image comprises a series of pixels each having an intensity;

determining signal gradients for a plurality of pixels in the video image;

counting how many pixels have both a signal gradient that is less than a first signal gradient value and an intensity less than a first intensity value to produce a first parameter value;

defining a plurality of regions in the video image wherein each region has a given plurality of pixels; and counting how many regions exist in which all the pixels in the region have both a signal gradient that is greater than a second signal gradient value and an intensity greater than a second intensity value;

determining, from the first parameter count, a probability that the object should be classified within a first class;

selecting a path along which to direct the object in response to the probability; and directing the object along the selected path.

3. The method as recited in claim 2 wherein the step of counting further comprises counting how many pixels have a signal gradient that is greater than a first gradient value and less than a second gradient value.

4. A method of sorting an object into one of at least a first class and a second class, said method comprising steps of:

producing a video image of an object in which the video image comprises a series of pixels each having an intensity;

determining signal gradients for a plurality of pixels in the video image;

counting how many pixels have both a signal gradient that is less than a first signal gradient value and an intensity less than a first intensity value to produce the first parameter count designated LFR; and further comprising:

defining a plurality of regions in the video image in which each region has a given plurality of pixels;

counting how many regions exist wherein all the pixels in the region have both a signal gradient that is greater than a second signal gradient value and an intensity greater than a second intensity value to produce a second parameter count designated HGR; and counting how many pixels have a signal gradient that is greater than a third signal gradient value and less than a fourth signal gradient value to produce a third parameter count designated MG;

determining, from the first parameter count, a probability that the object should be classified within a first class;

selecting a path along which to direct the object in response to the probability; and directing the object along the selected path.

5. The method as recited in claim 4 wherein the step of determining a probability comprises:

utilizing parameter counts LFR, HGR and MG to solve a first discriminate function for the first class to produce a value D1;

utilizing the parameter counts LFR, HGR and MG to solve a second discriminate function for the second class to produce a value D2; and calculating the probability as a function of the values D1 and D2.

6. The method as recited in claim 5 wherein the first and second discriminate functions have the form:

D1 or D2=-k1+k2(MG)+k3(LFR)+k4(HGR)

where k1, k2, k3 and k4 are constants which have one set of values for the first discriminate function and another set of values for the second discriminate function.

7. The method recited in claim 5 wherein the probability is derived from the expression:

$$PR = \frac{exp(D1)}{exp(D1) + exp(D2)}$$

8. A method of sorting an object into one of at least a first class and a second class, said method comprising steps of:

producing a plurality of video images of the object with each video image formed by a series of pixels each having an intensity;

determining signal gradients for a plurality of pixels in each video image;

for each video image counting how many pixels have both a signal gradient less than a first gradient value and an intensity less than a first intensity value to produce the first parameter count designated LFR; and further comprising:

defining a plurality of regions in the video image in which each region has a given plurality of pixels;

counting how many regions exists in which all the pixels in the region have both a signal gradient that is greater than a second gradient value and an intensity greater than a second intensity value to produce a second parameter count designated HGR; and counting how many pixels have a signal gradient that is greater than a third gradient value and less than a fourth gradient value to produce a third parameter count designated MG;

determining, from the parameter count, a probability that the object should be classified within the first class; and selecting a path along which to direct the object in response to the probability.

9. The method as recited in claim 8 wherein the step of producing a plurality of video images comprising activating a plurality of video cameras that are placed at different angles with respect to a trajectory of the object.

10. The method as recited in claim 8 wherein the step of counting further comprises adding the first parameter counts LFR for each image to produce a first sum LFRS; adding the second parameter counts LFR for each image to produce a second sum HGRS; and adding the third parameter counts MG for each image to produce a third sum MGS.

11. The method as recited in claim 10 wherein the step of determining a probability comprises:

using sums LFRS, HGRS and MGS to solve a first discriminate function for the first class to produce a value D1;

using sums LFRS, HGRS and MGS to solve a second discriminate function for the second class to produce a value D2; and deriving the probability as a function of values D1 and D2.

12. The method as recited in claim 11 wherein the first and second discriminate functions have the form:

D1 or D2=-K1+K2(MGS)+K3(LFRS)+K4(HGRS)

where k1, k2, k3 and k4 are constants which have one set of values for the first discriminate function and another set of values for the second discriminate function.

13. The method as recited in claim 12 wherein the probability is derived from the expression:

$$PR = \frac{exp(D1)}{exp(D1) + exp(D2)}$$

14. An apparatus for classifying objects, which apparatus comprises:

an input at which to receive a video image of an object in which the video image comprises a series of pixels each having an intensity;

a processor connected to said input and producing signal level gradients for a plurality of pixels in the video image;

an image evaluator coupled to said processor which comprises:

a first counter which determines how many pixels have both a signal gradient that is less than a first signal gradient value and an intensity less than a first intensity value to produce a first parameter value;

a second counter which determines how many regions exist wherein all the pixels in the region have both a signal gradient that is greater than a second signal gradient value and an intensity greater than a second intensity value to produce a second parameter value; and a third counter which determines how many pixels have a signal gradient that is greater than a third signal gradient value and less than a fourth signal gradient value to produce a third parameter value; and an output circuit which in response to the first, second and third parameter values transmits a command to a sorting device which command designates a path along which to direct the object.

* * * * *